United States Patent [19]
Landman et al.

[11] 3,805,212
[45] Apr. 16, 1974

[54] TERMINAL HOUSING FOR SUBSTRATE

[75] Inventors: Dirk Landman, Mechanicsburg; Ronald Chadwick, York, both of Pa.

[73] Assignee: Berg Electronic, Inc., New Cumberland, Pa.

[22] Filed: May 3, 1971

[21] Appl. No.: 139,635

[52] U.S. Cl.... 339/17 CF, 317/101 CP, 339/75 MP
[51] Int. Cl. ........................................... H05k 1/02
[58] Field of Search............174/68.5; 317/101 CP, 317/101 CC; 339/17R, 17 C, 17 L, 17 CF, 17 M, 18 R, 75 MP, 74, 174, 176 MP, 176 M, 192, 191 M, 275 B, 45, 18 B

[56] References Cited

UNITED STATES PATENTS

| | | | |
|---|---|---|---|
| 2,746,022 | 5/1956 | Gilbert | 339/45 M X |
| 3,663,921 | 5/1972 | Richard | 339/17 CF |
| 3,129,044 | 4/1964 | Lyman, Jr. et al. | 339/184 M X |
| 3,325,771 | 6/1967 | Ruehlemann et al. | 339/184 M |
| 3,501,582 | 3/1970 | Heidler et al. | 317/101 CC X |
| 3,525,972 | 8/1970 | Asick et al. | 339/192 R X |
| 3,297,974 | 1/1967 | Pittman | 317/101 CP |

FOREIGN PATENTS OR APPLICATIONS

| | | | |
|---|---|---|---|
| 1,224,474 | 2/1960 | France | 339/184 M |
| 1,474,721 | 2/1967 | France | 339/184 M |

*Primary Examiner*—Bobby R. Gay
*Assistant Examiner*—Terrell P. Lewis
*Attorney, Agent, or Firm*—Thomas Hooker

[57] ABSTRACT

A connector for mounting on a ceramic substrate parallel to a circuit board having a pair of like U-shaped supports each carrying a number of terminals for contact with the substrate. Locking members on the free ends of the support legs secure the supports to one another to form a frame surrounding the substrate and hold the substrate in electrical connection with the terminals. Portions of the terminals extend from the frame to facilitate the formation of electrical connections between the substrate and the circuit board.

15 Claims, 9 Drawing Figures

INVENTOR.
DIRK LANDMAN &
RONALD CHADWICK
BY
THOMAS HOOKER,
Their Attorney

INVENTOR.
DIRK LANDMAN &
RONALD CHADWICK
BY
THOMAS HOOKER,
Their Attorney

INVENTOR.
DIRK LANDMAN &
RONALD CHADWICK
BY
THOMAS HOOKER,
Their Attorney

TERMINAL HOUSING FOR SUBSTRATE

The invention relates to a connector or terminal support for mounting a ceramic substrate or similar member on a circuit board or like support with the substrate parallel to and spaced a slight distance away from the circuit board. The connector comprises a pair of like U-shaped insulating supports each carrying a number of spaced terminals for electrical engagement with contact pads at opposite edges of a substrate. Locking elements are provided on the free ends of the support legs so that the two like supports may be secured together to form a rectangular frame surrounding the substrate and holding the substrate in electrical connection with the terminals. Each support includes a shelf on which the substrate is placed during closing of the supports so that the substrate is properly supported for engagement with the terminals. The locking elements assure that the two supports are properly aligned both vertically and laterally during closing prior to engagement between the substrate and the terminals thereby assuring that the terminals are properly positioned in engagement with the substrate. In this way the substrate is not subjected to stresses which would tend to twist or break it.

The terminals held in the supports include tail portions which project from the bottom of the connector and which may be secured in electrical connection with the circuit board by means of a solder connection or may be inserted into disconnect sockets mounted on the circuit board. In the case of a failure of a circuit on the substrate, the two supports forming the frame are easily separated to disengage the terminals from the substrate and permit removal of the defective substrate and insertion of a new substrate.

Conventional metal contacts for ceramic substrates are formed of a Kovar alloy and are metallurgically secured to the contact pads on the substrate during firing of the substrate. The Kovar leads are stamped from a strip of the alloy so that during the firing operation each lead is held in place on a Kovar frame. Subsequent to the firing operation the leads are severed from the frame so that they are electrically independent of each other. The Kovar leads extending from the ceramic substrate may then be secured to a circuit board by conventional metallurgical means thereby forming the desired electrical connection between the circuit board and the circuit elements on the substrate.

The connector disclosed herein forms electrical connections between circuit pads on both edges of a ceramic substrate and circuit elements in a circuit board without the use of expensive Kovar leads. The terminals held in both insulating suppots may be stamped from relatively inexpensive sheet metal stock, such as brass. The supports themselves are formed inexpensively through a plastic molding operation. The resultant connector is less expensive to produce than the conventional Kovar lead approach and also provides additional flexibility over the conventional approach. The substrate is removably secured in the connection so that a defective substrate may be replaced. Further, the frame formed by the two supports facilitates handling of the substrates and protects them thus reducing the possibility of damage to the relatively fragile substrates both prior to and subsequent to mounting on the circuit board.

Other objects and features of the invention will become apparent as the description proceeds, especially when taken in conjunction with the accompanying drawings illustrating the invention, of which there are three sheets.

IN THE DRAWINGS

Figure 1:
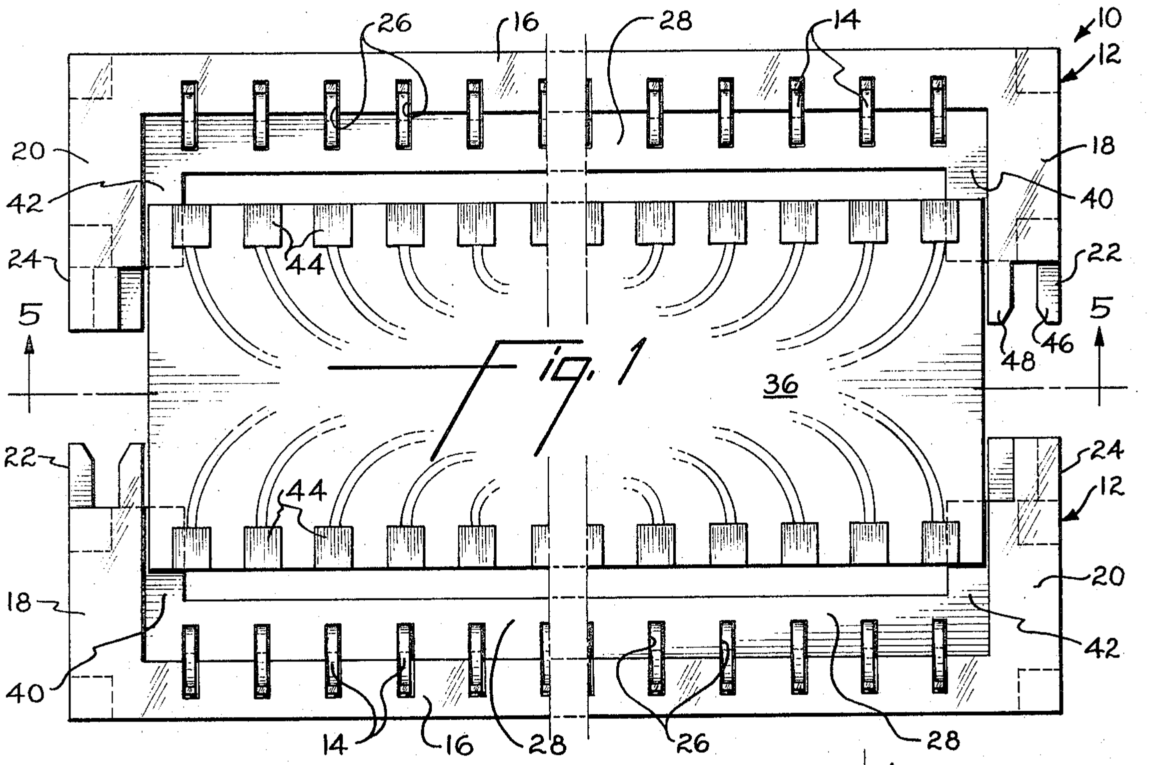
FIG. 1 is a plan view of a terminal housing according to the invention showing the housing open.
Figure 2:
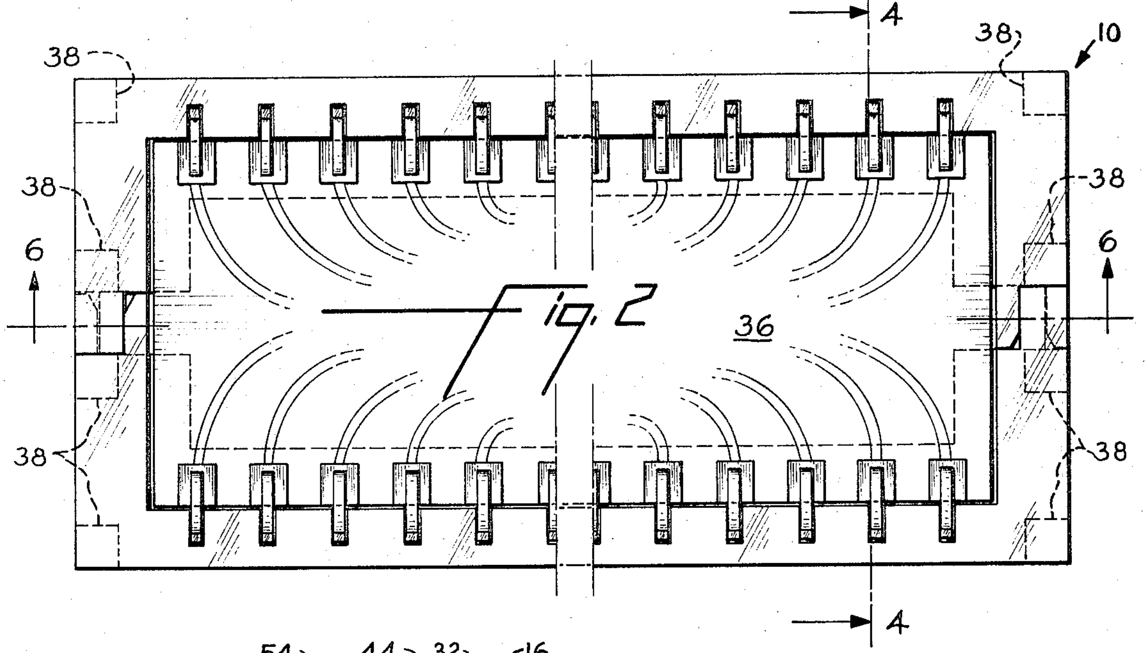
FIG. 2 is similar to FIG. 1 showing the housing closed.
Figures 8, 9:
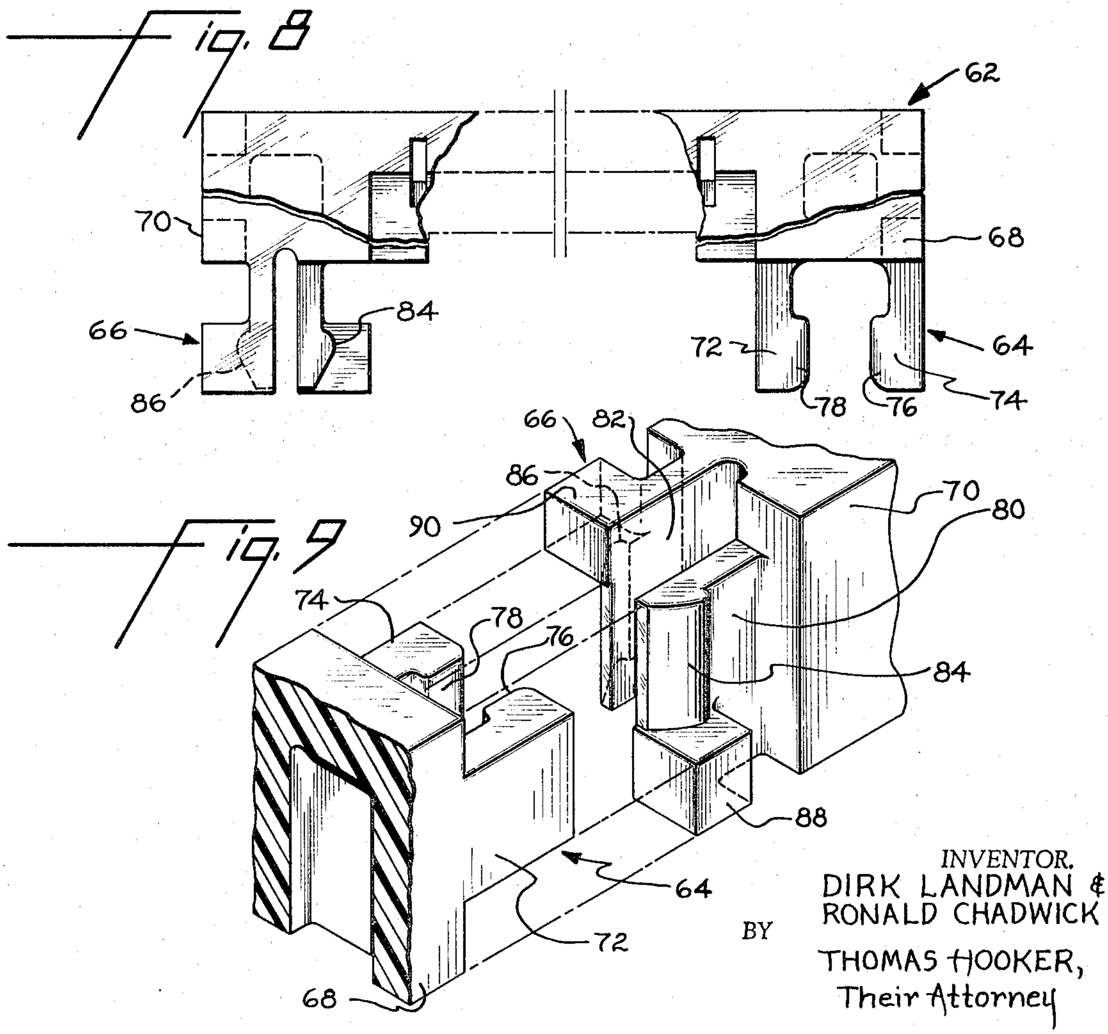
Figure 5:
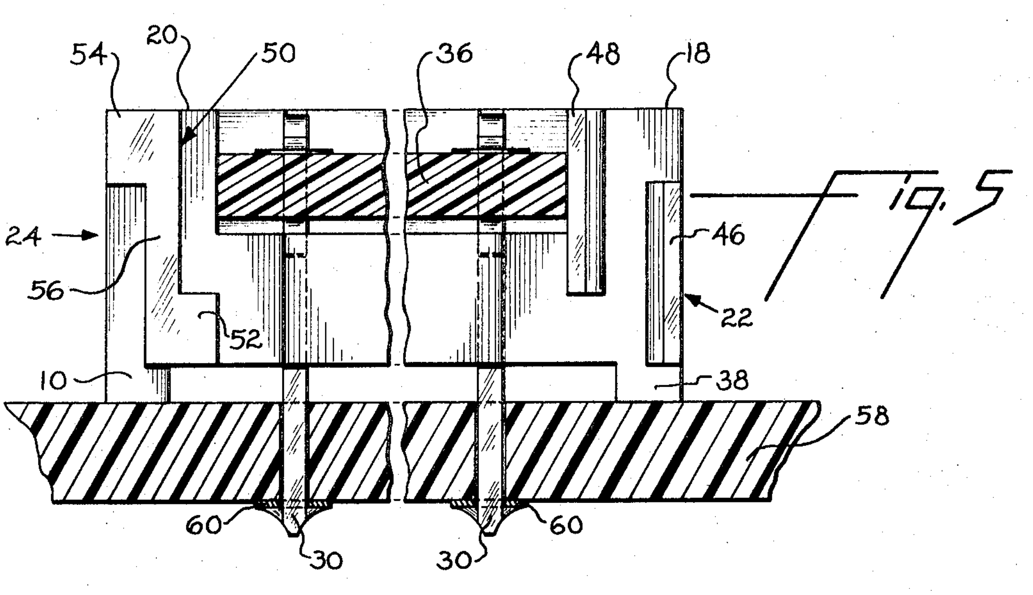
Figure 6:
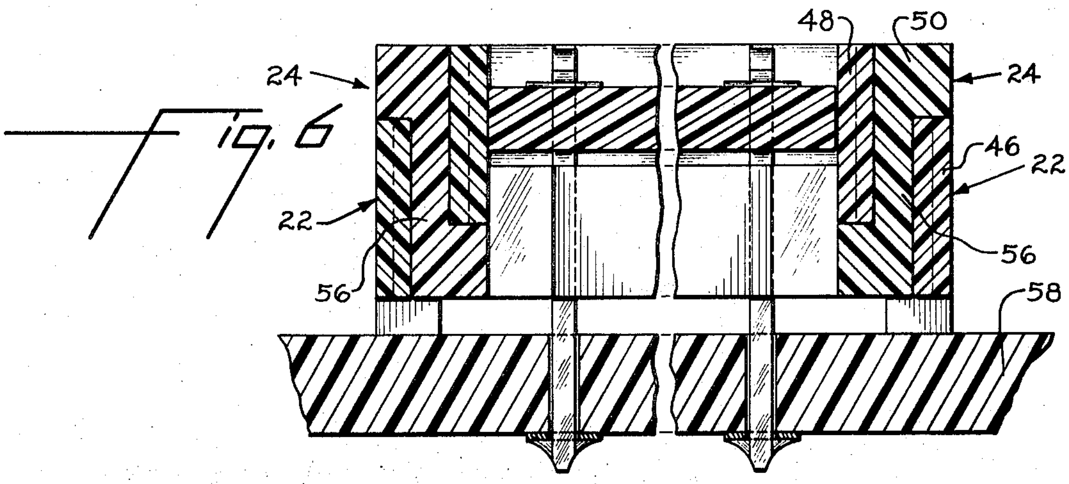
Figure 7:
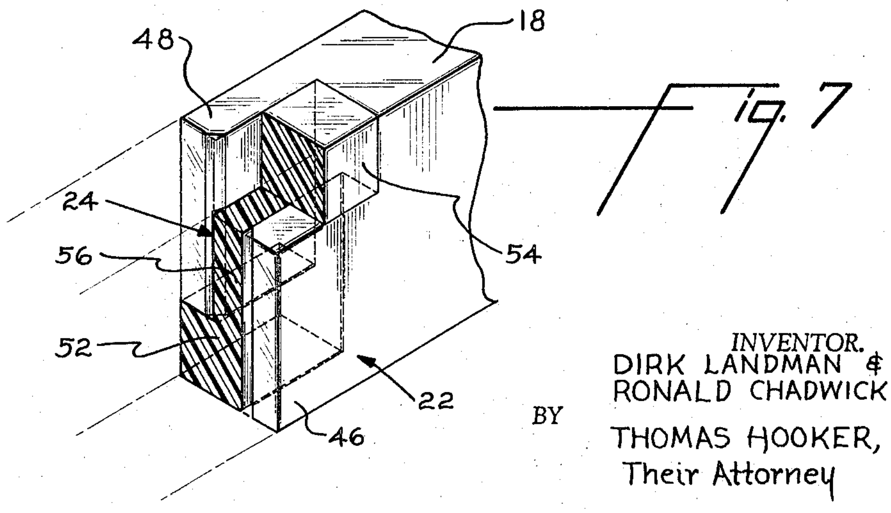

FIGS. 5 and 6 are sectional views taken along lines 5—5 of FIG. 1 and 6—6 of FIG. 2 respectively;

FIG. 7 is a broken away perspective view of the locking members in the locked position;

FIG. 8 is a partially broken away view of an insulating member of a second embodiment of the invention; and FIG. 9 is a perspective view illustrating the position just before locking together of the insulating members of the second embodiment.

The ceramic substrate terminal support or connector 10 illustrated in FIGS. 1 thru 7 is made up of a pair of like U-shaped insulating supports 12 each of which carries a plurality of contact terminals 14. The supports 12 may be formed from suitably plastic by a molding operation. Terminals 14 may be stamp-formed from a suitable metal such as a strip of brass.

Each support 12 includes an elongate terminal portion 16 and a pair of legs 18 and 20 which project outwardly in the same direction from the ends of portion 16 at right angles. Locking elements 22 and 24 are located on the free ends of legs 18 and 20 respectively.

Figure 4:
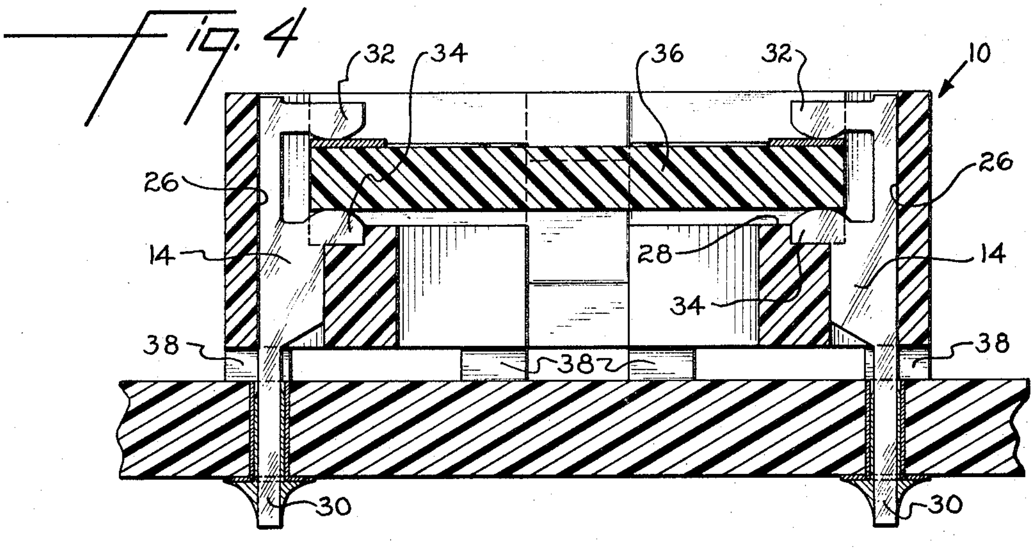
FIG. 4 is a sectional view taken along line 4—4 of FIG. 2.

A plurality of terminal recesses is formed in each support 12. The recesses extend through the thickness of terminal portion 16 and are spaced at regular intervals along the length thereof as illustrated in FIGS. 1 and 4. Each recess 26 extends into the substrate shelf 28 which runs along the interior side of portion 16 between legs 18 and 20. As indicated in FIG. 1, the shelf 28 also extends along the interior sides of legs 18 and 20 a distance away from terminal portion 16 and is U-shaped.

Terminals 14 may be stamped from brass strip stock or other suitable material. They are generally F-shaped and each includes laterally extending contacts 32 and 34 and a terminal tail 30. As illustrated in FIG. 4, the terminals 14 are fitted in recesses 26 with each contact 34 seated in the portion of recess 26 extending into shelf 28 so that the space between the contacts is located slightly above the shelf. The interior facing surface of contacts 32 and 34 are rounded to facilitate insertion of the edge of the ceramic substrate as illustrated.

Figure 3:
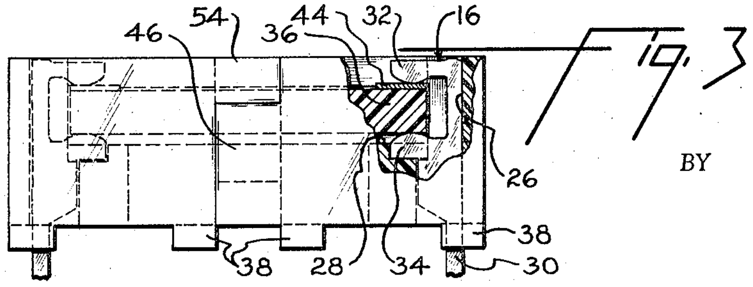
FIG. 3 is a partially broken away end view of the housing in the closed position.

When the terminals 14 are mounted in the supports 12, the terminal tails 30 thereof project below the bottom of the supports for contact with circuit elements exterior to the support 10. As illustrated in FIGS. 3 and 4, spacers 38 project from the bottom of the ends of both terminal portion 16 and legs 18 and 20. The spacers 38 provide a separation between the support 10 and a circuit board on which the support may be mounted.

Locking elements 22 and 24 on supports 12 cooperate to form a connection between the opposed insulated supports 12 when assembled, as in FIG. 2. Locking element 24 on arm 20 of each of the supports 12 in FIG. 1 engages the locking element 22 on arm 18 of the other support to form the connection and secure the supports 12 together as a rectangular frame. By providing complimentary locking elements it is possible to use two like insulating supports 12 to form a single terminal support 10.

With a pair of insulating supports 12 positioned as in FIG. 1 with terminals 14 confined in each terminal recess 26, a ceramic substrate is positioned between legs 18 and 20 and legs 40 and 42 of shelf 28 which extend along the support legs. The substrate includes a number of contact pads 44 located on the top surface of the substrate along the edges adjacent terminals 14. Pads 44 are connected to circuitry (not illustrated) carried on the substrate. With the substrate positioned as in FIG. 1 each pad 44 is adjacent a terminal 14.

With the supports 12 and substrate 36 positioned as in FIG. 1, the two shelves 28 support the substrate at the proper level so that when the supports 12 are pushed toward each other, the substrate pads 44 move into engagement with the terminal contacts 32 and 34 of terminals 14. Prior to engagement, however, between the terminals and the substrate the locking elements 22 and 24 on the sides of the supports 12 engage each other in the manner which will be described hereinafter to assure that the supports 12 are accurately aligned relative to each other. Further movement of the supports toward each other fully engage two pairs of locking elements 22, 24 and forces the edges of the substrate adjacent terminals 14 between the terminal contacts 32 and 34 of each terminal, as illustrated in FIG. 4. The curved surfaces of the contacts facilitates movement of the substrate between them. Because the normal minimum spacing between contacts 32 and 34 is slightly less than the thickness of the substrate which is forced between them, each contact 32 forms a high pressure wiped electrical connection with a pad 44. During final closing of the supports 12, the substrate 36 is lifted from shelves 28 so that it is supported solely by terminals 16. The locking elements 22 and 24 assure proper alignment between the supports prior to movement of the substrate between the terminal contacts so that the relatively brittle substrate is not subjected to torque, thereby minimizing breakage or chipping of the substrate.

Locking elements 22 and 24 and their relationship is best illustrated in FIGS. 5, 6 and 7. Element 22 comprises a pair of flat parallel and laterally offset fingers 46 and 48 which project away from the free end of leg 18. Element 24 comprises a generally Z-shaped projection 50 extending from the free end of leg 20 having lateral projections 52 and 54 at opposite ends thereof projecting in opposite directions. Finger portion 56 connects projections 52 and 54.

FIGS. 6 and 7 illustrate that when the two supports 12 are locked together the member 50 of each element 24 is locked between the fingers 46 and 48 of the corresponding element 22. Finger 56 has an interference fit between fingers 46 and 48 to assure that the two supports 12 are not laterally offset during closing. Each projection 52 and 54 has an interference fit with one edge of a finger 46 and 48 respectively to assure that the two supports 12 are not vertically offset during closing. Because the elements 22 and 24 are sufficiently engaged to assure alignment between supports 12 prior to the time when the ceramic substrate 36 is forced between the terminal contacts, proper alignment of the supports is assured. When the supports are locked together they form a rectangular frame which surrounds the substrate and protects it from injury.

After the supports 12 have been closed and the ceramic substrate is in electrical connection with the terminals, the assembly may be mounted on a circuit board 58 as illustrated in FIG. 5 with terminal tails 30 extending through holes formed through the thickness of the circuit board. The circuit board may then be soldered to form electrical connections between the tails and printed circuitry 60 on the bottom of the circuit board. Spacers 38 support the assembly 10 above the top surface of circuit board 58 to prevent solder wicking between adjacent terminal tails 30 and to facilitate the removal of flux.

If desired the assembly 10 may be mounted on the circuit board by inserting terminals tails 30 into disconnect sockets or like contacts on the circuit board. In this way the assembly may be easily removed from the circuit board when desired. Alternatively, wire wrap or other types of connections may be formed between the terminals 14 and circuit elements. Because individual supports 12 are easily opened by pulling them apart from each other, the substrate 36 is readily removed from the assembly when desired and may be replaced in case circuitry carried thereby is defective.

The locking elements provided on the free ends of the legs of each like support are complimentary with each other to assure that two of the supports when moved together to form a rectangular frame lock when together. During closing of the supports the locking member on one arm of one support engages the locking member on the other arm of the other support. By providing complimentary members on each arm of each support, like supports may be used to form the connector frame. This greatly reduces the cost of manufacture of the connectors as both supports may be identical and only a single molding die is required.

FIGS. 8 and 9 illustrate a further embodiment of the invention which is like the embodiment of FIGS. 1 thru 7 with the exception that different types of locking elements are used to secure together the insulating supports.

Support 62 is identical to support 12 with the exception that different locking elements 64 and 66 are provided on the ends of legs 68 and 70. Locking element 64 comprises a pair of like latch fingers 72 and 74 which extend from the opposite sides of finger 68 midway between the top and bottom of the finger. Inwardly facing locking shoulders 76 and 78 extend along the width of the fingers at the ends thereof.

Locking element 66 comprises a pair of spaced apart parallel and laterally offset fingers 80 and 82 which project from the free end of leg 68. Fingers 80 and 82 are located inwardly from the side edges of the leg. The outer surfaces of the fingers 80 and 82 are provided with latches 84, 86 and also with laterally extending projections 88, 90.

When two supports 62 are assembled the fingers 72 and 74 are moved toward fingers 80 and 82 so that the shoulders 76, 78 engage the latches 84 and 86 with one edge of finger 72 on top of projection 88 and one edge of finger 74 on the bottom edge of projection 90. Further closing of the support 62 flexes the fingers somewhat to permit shoulders 76, 78 to pass latches 84 and 86 following which the latches and fingers snap back to hold the supports in the closed position. The elements 64 and 66 cooperate to assure that the supports are in proper lateral and vertical alignment prior to engagement between the terminals and the substrate. Latches 84, 86 and shoulders 76, 78 cooperate to lock the supports 62 together. When desired the supports may be separated by moving fingers 80 and 82 together by depressing projections 88 and 90 so that the latches 84 and 86 are moved together and the supports are unlocked.

While we have illustrated and described preferred embodiments of our invention, it is understood that these are capable of modification and we therefore do not wish to be limited to the precise details set forth, but desire to avail ourselves of such changes and alterations as fall within the purview of the following claims.

What we claim as our invention is:

1. A connector block assembly comprising a pair of like U-shaped insulating bodies and a flat rectangular circuit member having contact areas extending along opposite edges thereof, each body including an elongate terminal portion having a plurality of terminals mounted thereon at regular intervals along the length thereof with each terminal including a contact for engaging a contact on one edge of the flat circuit member and contact means for forming an electrical connection with a circuit element, said contact being located along one side of the terminal portion, and each body also including a pair of arms at the ends of said terminal portion extending away from said side and past said contacts, said arms including complementary locking means at the free ends thereof, said insulating bodies being locked together with the locking means on the end of each arm of each body engaging the locking means on the end of the other arm of the other body to form a rectangular frame surrounding the circuit member with the terminal contacts engaging the circuit member contact areas.

2. A connector block for a flat circuit member having contact areas extending along opposite edges thereof comprising a pair of like insulating bodies each including an elongated terminal portion having a plurality of terminals mounted thereon at regular intervals along the length thereof with each terminal including a circuit member contact at one side of the terminal portion and contact means for forming an electrical connection with a circuit element, and a pair of arms at the ends of said terminal portion extending away from said side, said arms including complimentary locking means at the free ends thereof whereby said insulating bodies may be locked together by engaging the locking means on the end of each arm of each body with the locking means on the end of the other arm of the other body to form a frame holding the circuit member in electrical contact with the contact portions of the terminals, and each of said bodies including circuit member supporting means on the interior faces of said arms for supporting the circuit member prior to engagement of said locking means with the contact areas of such member in alignment with their respective terminal contacts.

3. A connector block as in claim 2 wherein said supporting means comprises a shelf on each arm for aligning the circuit member laterally with respect to the axis of the terminal portion and a wall on each arm for aligning the circuit member longitudinally of said axis.

4. A connector block for forming an electrical connection with contact areas on opposite edges of a flat circuit member comprising a pair of like U-shaped insulating bodies each including an elongate terminal portion having a plurality of terminals mounted thereon at regular intervals along the length thereof with each terminal including a pair of spaced contact fingers adapted to receive an edge of a circuit member therebetween to form an electrical connection between the terminal and the circuit member and contact means for forming an electrical connection with a circuit element, said contact fingers being spaced along one side of the terminal portion, and each body also including a pair of arms at the ends of said terminal portion extending away from said side and past said fingers, said arms including complementary locking means at the free ends thereof whereby said insulating bodies may be locked together by engaging the locking means on the end of each arm of each body with the locking means on the end of the other arm of the other body to form a frame surrounding the circuit member with the terminal fingers engaging the circuit member contact areas.

5. A connector block as in claim 4 wherein each terminal is generally F-shaped and includes a tail which extends outwardly from another side of said terminal portion.

6. A connector block as in claim 5 wherein said insulating bodies are identical.

7. A connector block for forming electrical connections with contacts on opposite sides of a rectangular ceramic substrate or like member comprising a pair of like insulating bodies engagable with each other to form a rectangular frame surrounding the substrate, each body having an elongated terminal portion with a first arm at one end of the terminal portion extending away therefrom in a direction at right angles to the axis of the terminal portion and a second arm at the other end of the terminal portion extending away from the terminal portion in the same direction as said first arm, a plurality of terminals mounted at intervals along the terminal portion with contacts facing in said direction for engagement with contact areas on the substrate, substrate support means on the adjacent terminal contacts for locating the substrate relative to the terminal contacts, and complementary locking means located on the free end of each arm whereby said insulating bodies may be assembled to form a hollow rectangular frame for holding the ceramic substrate in electrical connection with the terminals in each insulating body.

8. A connector block as in claim 7 wherein said locking means are integral with said arms and are of the interference fit type.

9. A connector block as in claim 7 wherein said locking means are integral with said arms and are of the latch type.

10. A connector block for forming electrical connections with contacts on opposite sides of a rectangular ceramic substrate or like member comprising a pair of identical insulating bodies engagable with each other to form a generally rectangular frame surrounding the substrate, each body having an elongate terminal portion with an arm at one end of the terminal portion extending away therefrom in a direction at right angles to the axis of the terminal portion, a plurality of terminals mounted at intervals along the terminal portion with contacts facing in said direction for engagement with contact areas on the substrate, substrate support means on the adjacent terminal contacts for locating the substrate relative to the terminal contacts, and complementary locking means integral with said insulating bodies located at the free end of the arm and at the other end of the terminal portion of the bodies whereby said insulating bodies may be assembled to form a hollow rectangular frame for holding the ceramic substrate in electrical connection with the terminals in each insulating body.

11. A connector block assembly comprising a pair of identical U-shaped insulating bodies and a rectangular ceramic substrate or like member, each body including an elongate terminal portion having a plurality of terminal recesses formed therein, a contact terminal positioned in each recess with the tail extending from said portion and a contact exposed on one side of said terminal portion of said body, and an arm at each end of said terminal portion of the body extending away from such side of the terminal portion with locking means located at the free ends of said arms, the locking means of one body engaging the locking means of the other body to form a rectangular frame surrounding the ceramic substrate with the cer-amic substrate contact areas in electrical connection with the exposed terminal contacts of said bodies.

12. A connector block assembly as in claim 11 including a substrate supporting shelf formed on the interior edges of each of said arms of each body for supporting the substrate in position to make electrical connection with the contact terminals prior to securing said bodies together.

13. A connector block assembly as in claim 11 including a U-shaped supporting shelf formed on the interior of each of said bodies for supporting a ceramic substrate prior to closing of said bodies.

14. A connector block assembly as in claim 11 wherein said arms are of equal length.

15. A connector block assembly comprising a pair of like insulating bodies engagable with each other to form a rectangular frame and a rectangular ceramic substrate or like member with contacts on opposite edges thereof, each body having an elongate terminal portion with an arm at one end of the terminal portion extending away therefrom in a direction at right angles to the axis of the terminal portion, a plurality of terminals mounted at intervals along the terminal portion with contacts facing in said direction for engagement on the substrate, substrate support means on the adjacent terminal and complementary locking means located at the free end of the arm and at the other end of the terminal portion, said insulating bodies forming a hollow rectangular frame surrounding the ceramic substrate with the locking means at the end of the arm of each body engaging the locking means at the other end of the terminal portion of the other body and with the contacts on the sides of the ceramic substrate in electrical connection with the terminals in each insulating body.

* * * * *

UNITED STATES PATENT OFFICE
CERTIFICATE OF CORRECTION

Patent No. 3,805,212 Dated April 16, 1974

Inventor(s) DIRK LANDMAN and RONALD CHADWICK

It is certified that error appears in the above-identified patent and that said Letters Patent are hereby corrected as shown below:

On the cover page after "[73] Assignee:", "Berg Electronics, Inc., New Cumberland, Pa." should read -- E. I. du Pont de Nemours & Company, Wilmington, Delaware--.

Column 5, Claim 1, line 34, "contact" should read --contacts--.

Column 7, Claim 11, ~~line 31,~~ "cer-amic" should read --ceramic--.

Signed and sealed this 1st day of October 1974.

(SEAL)
Attest:

McCOY M. GIBSON JR.
Attesting Officer

C. MARSHALL DANN
Commissioner of Patents

-1050 (10-69)

USCOMM-DC 60376-P69
* U.S. GOVERNMENT PRINTING OFFICE : 1969 O—366-334